US012461172B2

United States Patent
Kim et al.

(10) Patent No.: US 12,461,172 B2
(45) Date of Patent: Nov. 4, 2025

(54) METHOD FOR IDENTIFYING AN ATTACHED STATE OR A DETACHED STATE OF AN ACCESSORY DEVICE AND ELECTRONIC DEVICE SUPPORTING THE SAME

(71) Applicant: Samsung Electronics Co., Ltd., Suwon-si (KR)

(72) Inventors: Taekeun Kim, Suwon-si (KR); Kihun Eom, Suwon-si (KR); Intae Jun, Suwon-si (KR); Kihoon Kang, Suwon-si (KR); Kihong Min, Suwon-si (KR); Gunhee Park, Suwon-si (KR); Jeonggyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 18/449,414

(22) Filed: Aug. 14, 2023

(65) Prior Publication Data

US 2024/0003989 A1   Jan. 4, 2024

Related U.S. Application Data

(63) Continuation of application No. PCT/KR2022/002162, filed on Feb. 14, 2022.

(30) Foreign Application Priority Data

Feb. 16, 2021 (KR) .................. 10-2021-0020638

(51) Int. Cl.
*G01R 33/00* (2006.01)
*G01R 33/02* (2006.01)

(52) U.S. Cl.
CPC ..... *G01R 33/0023* (2013.01); *G01R 33/0047* (2013.01); *G01R 33/02* (2013.01)

(58) Field of Classification Search
CPC ............ G01R 33/0023; G01R 33/0047; G01R 33/02; G06F 1/1616; G06F 1/1626;
(Continued)

(56) References Cited

U.S. PATENT DOCUMENTS 8,289,115 B2   10/2012   Cretella, Jr. et al.
8,624,695 B2    1/2014   Cretella, Jr. et al.
(Continued)

FOREIGN PATENT DOCUMENTS

KR   20140096893 A   8/2014
KR   20150023120 A   3/2015
(Continued)

OTHER PUBLICATIONS

Extended European Search Report dated Jun. 11, 2024 for EP Application No. 22756442.4.
(Continued)

*Primary Examiner* — Alvaro E Fortich
(74) *Attorney, Agent, or Firm* — Nixon & Vanderhye P.C.

(57) ABSTRACT

An electronic device may include: a magnetic sensor configured to identify the intensity of a magnetic field; a wireless communication circuit; a processor; and memory electrically connected to the magnetic sensor, the wireless communication circuit, and the processor, and storing instructions. The processor may be configured so that the electronic device: uses the magnetic sensor to identify a plurality of intensities of the magnetic field during a first period; identifies, on the basis of the plurality of intensities, whether a reference intensity has been updated; identifies a first state of the electronic device when the reference intensity has been updated, the first state being identified on the basis of a comparison result between the latest intensity among the plurality of intensities and the updated reference intensity; and performs a function according to the identified
(Continued)

first state. Various other embodiments identified through the specification are possible.

20 Claims, 12 Drawing Sheets

(58) Field of Classification Search
CPC ........... G06F 2200/1633; G06F 1/1632; G06F 1/1641; G06F 1/165; G06F 1/1677; G06F 1/1686; G06F 1/1694; G06F 1/1698; H04M 1/72454; H04M 1/72412; H04M 2250/04; H04M 1/72409; H04M 2201/34; H04M 2201/36; H04M 2250/12
See application file for complete search history.

(56) References Cited

U.S. PATENT DOCUMENTS

| | | | |
|---|---|---|---|
| 9,069,339 | B2 | 6/2015 | Cretella, Jr. et al. |
| 9,159,260 | B2 | 10/2015 | Oh et al. |
| 9,342,102 | B2 | 5/2016 | Kim |
| 9,742,456 | B2 | 8/2017 | Park et al. |
| 9,973,620 | B2 | 5/2018 | Baek et al. |
| 9,974,026 | B2 | 5/2018 | Chen |
| 10,236,106 | B2 | 3/2019 | Lauder et al. |
| 10,484,477 | B2 * | 11/2019 | Nasir .................... H04L 67/125 |
| 10,580,556 | B2 | 3/2020 | Lauder et al. |
| 10,707,912 | B2 | 7/2020 | Kim et al. |
| 10,916,363 | B2 | 2/2021 | Lauder et al. |
| 11,108,424 | B2 | 8/2021 | Schooley et al. |
| 11,664,842 | B2 | 5/2023 | Schooley et al. |
| 2015/0378592 | A1 * | 12/2015 | Kim ....................... G06F 1/1626 |
| | | | 715/765 |
| 2016/0044032 | A1 * | 2/2016 | Kim .................... H04L 41/0806 |
| | | | 726/5 |
| 2016/0077621 | A1 | 3/2016 | Min et al. |
| 2017/0001560 | A1 * | 1/2017 | Roisen .................... B60Q 9/00 |
| 2020/0103474 | A1 | 4/2020 | Foletto et al. |
| 2020/0170054 | A1 * | 5/2020 | Lee ....................... H04L 12/282 |
| 2021/0391885 | A1 | 12/2021 | Schooley et al. |

FOREIGN PATENT DOCUMENTS

| | | |
|---|---|---|
| KR | 20150103955 A | 9/2015 |
| KR | 20160042203 A | 4/2016 |
| KR | 20160076347 A | 6/2016 |
| KR | 20170052964 A | 5/2017 |
| KR | 102097528 B1 | 4/2020 |

OTHER PUBLICATIONS

International Search Report for PCT/KR2022/002162 mailed Jun. 7, 2022, 2 pages.
Korean Office Action dated Jul. 25, 2025 for KR Application No. 10-2021-0020638.

* cited by examiner

|  |  | Δ By [mT] | Δ Bz [mT] |
|---|---|---|---|
| L[mm] | 3 | 2.53 | 0.02 |
|  | 3.1 | 2.42 | −0.03 |
|  | 3.2 | 2.31 | −0.08 |
|  | 3.3 | 2.21 | −0.12 |
|  | 3.4 | 2.12 | −0.16 |
|  | 3.5 | 2.03 | −0.19 |
|  | 3.6 | 1.94 | −0.22 |
|  | 3.7 | 1.86 | −0.24 |
|  | 3.8 | 1.77 | −0.26 |
|  | 3.9 | 1.70 | −0.28 |
|  | 4 | 1.62 | −0.30 |
|  | 4.1 | 1.55 | −0.31 |
|  | 4.2 | 1.49 | −0.32 |
|  | 4.3 | 1.42 | −0.33 |
|  | 4.4 | 1.36 | −0.34 |
|  | 4.5 | 1.31 | −0.35 |
|  | 4.6 | 1.25 | −0.35 |
|  | 4.7 | 1.20 | −0.36 |
|  | 4.8 | 1.15 | −0.36 |
|  | 4.9 | 1.10 | −0.36 |
|  | 5 | 1.05 | −0.36 |
|  | 5.1 | 1.01 | −0.36 |
|  | 5.2 | 0.97 | −0.36 |

METHOD FOR IDENTIFYING AN ATTACHED STATE OR A DETACHED STATE OF AN ACCESSORY DEVICE AND ELECTRONIC DEVICE SUPPORTING THE SAME

CROSS-REFERENCE TO RELATED APPLICATIONS

This application is a continuation of International Application No. PCT/KR2022/002162, filed on Feb. 14, 2022, designating the United States, in the Korean Intellectual Property Receiving Office, and claiming priority to KR 10-2021-0020638 filed on Feb. 16, 2021, the disclosures of which are all hereby incorporated by reference herein in their entireties.

FIELD

Background

Certain example embodiments relate to an electronic device including a magnetic sensor and/or a method for operating the same.

Description of Related Art

An electronic device may determine whether an accessory device including a magnetic body (e.g., a magnet) is attached or detached, by using an analog sensor (e.g., a Hall sensor). For example, when electromotive force identified by a magnetic field around the electronic device is higher than or equal to a threshold value, the analog sensor may identify that the accessory device is attached. When the electromotive force is lower than the threshold value, the analog sensor may identify that the accessory device is detached.

When a substance with magnetism is located around an electronic device or magnetization occurs around the electronic device, the electronic device including the analog sensor may malfunction. For example, when a substance having magnetism is approached, it may be recognized that the accessory device is attached even though the accessory device is detached, because a base value of the electromotive force of the analog sensor increases.

SUMMARY

An electronic device may provide functions according to attachment or detachment of an accessory device. When the electronic device including an analog sensor malfunctions, the electronic device may cause inconvenience to a user by providing incorrect functions.

A method capable of identifying an exact state of the electronic device despite a change in surrounding environments will be discussed.

According to an example embodiment, an electronic device may include a magnetic sensor that identifies an intensity of a magnetic field, a wireless communication circuit, a processor, and a memory electrically connected, directly or indirectly, to the magnetic sensor, the wireless communication circuit, and the processor, and storing instructions. When executed by the processor, the instructions may cause the electronic device to (the processor may be configured to) identify a plurality of intensities of the magnetic field during a first period by using the magnetic sensor, to determine whether to update a reference intensity, based on the plurality of intensities, to identify a first state of the electronic device based on a comparison result between a latest intensity among the plurality of intensities and the updated reference intensity when the reference intensity is updated, and to perform a function according to the identified first state.

According to an example embodiment, an operating method of an electronic device may include identifying a plurality of intensities of a magnetic field during a first period, determining whether to update a reference intensity, based on the plurality of intensities, identifying a first state of the electronic device based on a comparison result between a latest intensity among the plurality of intensities and the updated reference intensity when the reference intensity is updated, and performing a function according to the identified first state.

According to various example embodiments, in identifying the state of an electronic device, accuracy may be increased by using a relative change in intensities of the magnetic field identified during a specific period, and a short-range wireless signal.

Besides, a variety of effects directly or indirectly understood through the specification may be provided.

Effects obtained in various embodiments are not limited to the above-mentioned effects, and other effects that are not mentioned will be clearly understood by those skilled in the art, to which the disclosure belongs, from the following description.

BRIEF DESCRIPTION OF DRAWINGS

The above and other aspects, features, and advantages of certain example embodiments will be more apparent from the following detailed description, taken in conjunction with the accompanying drawings, in which:

FIG. 3B shows a table showing an example change in a magnetic field according to a change in a distance between a magnetic sensor and a magnet.

DETAILED DESCRIPTION

Figure 1:
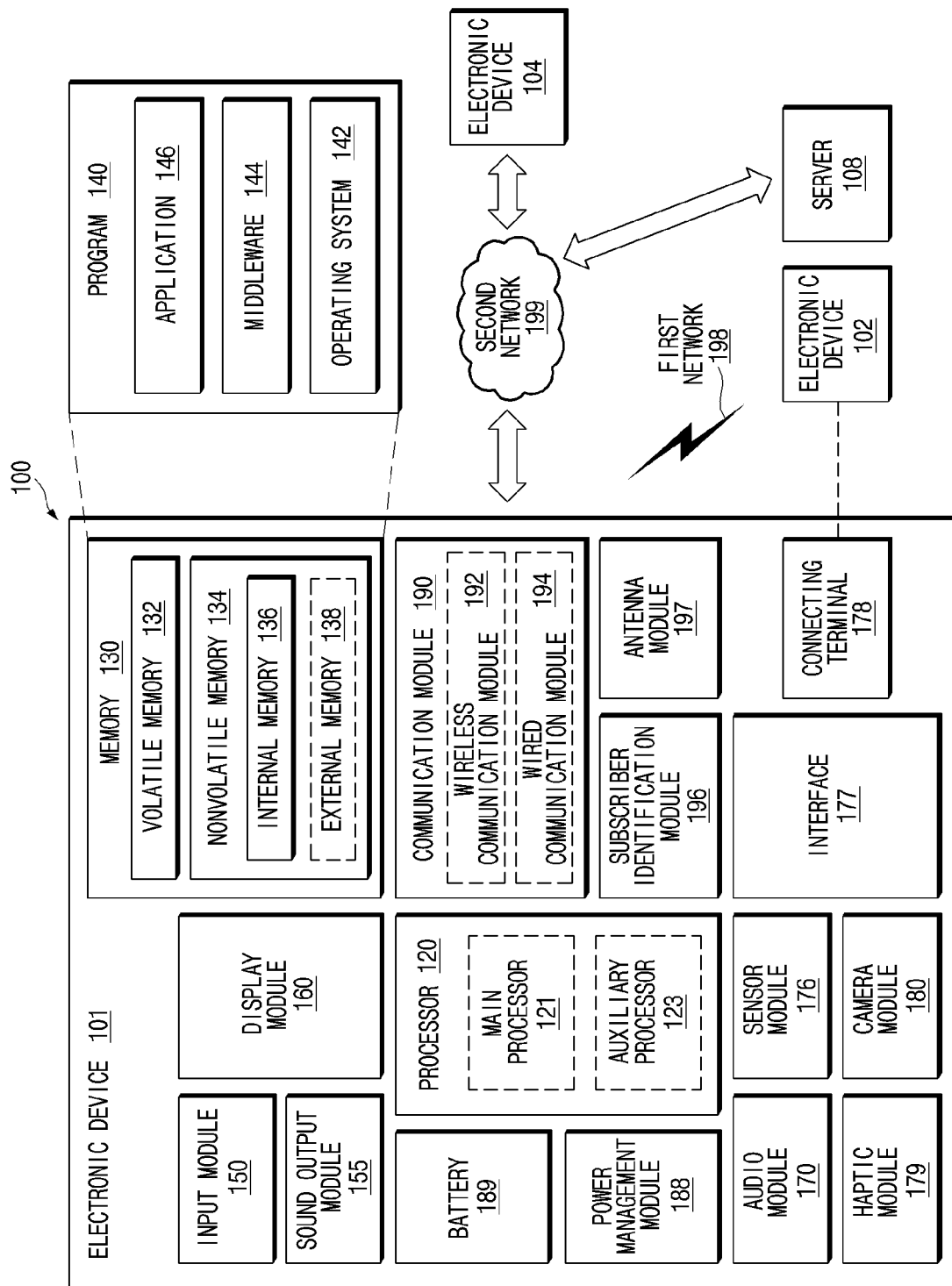
FIG. 1 is a block diagram of an electronic device in a network environment, according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector.

According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
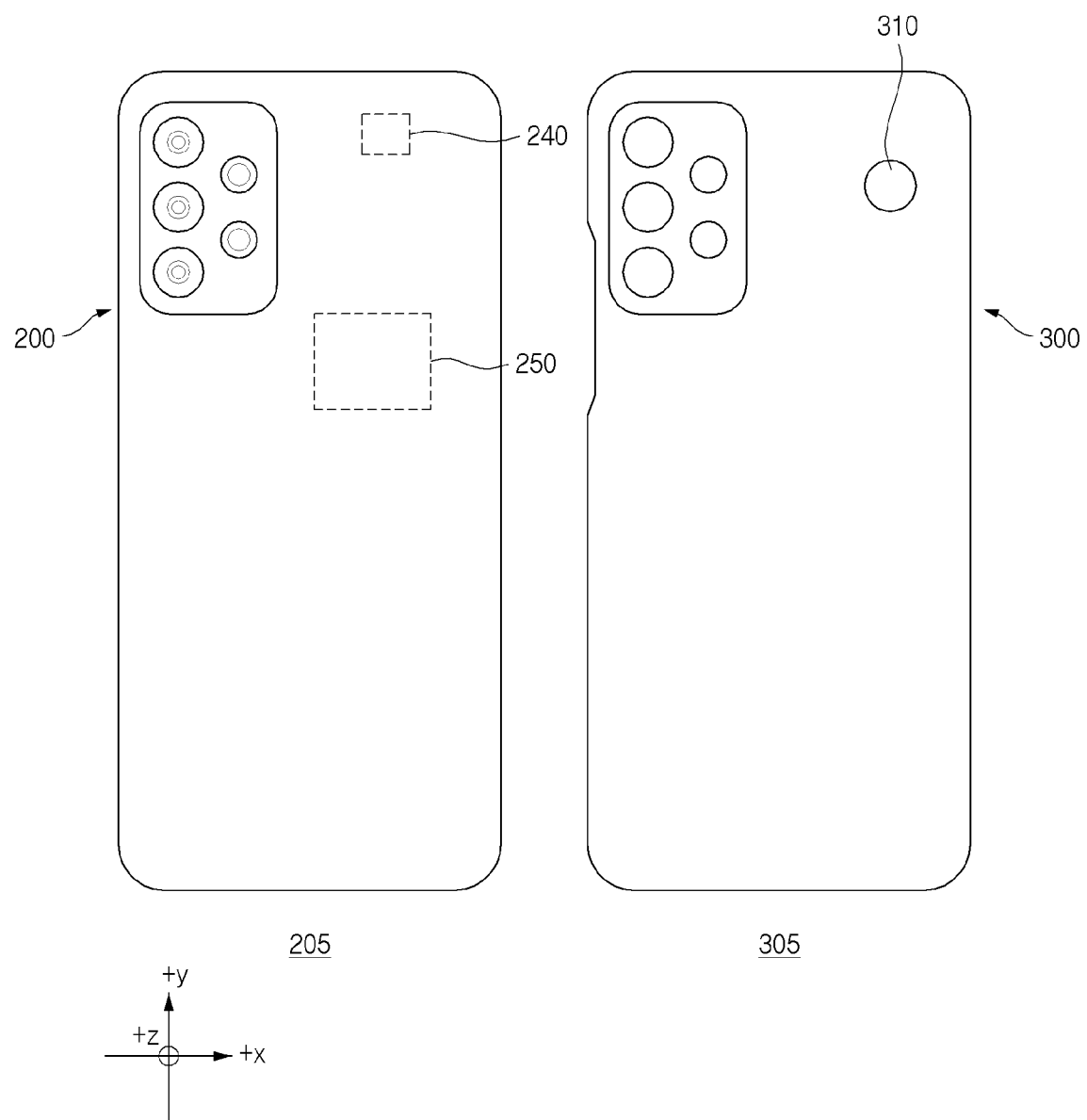
FIG. 2 illustrates an electronic device and an accessory device, according to an example embodiment.
Figure 3A:
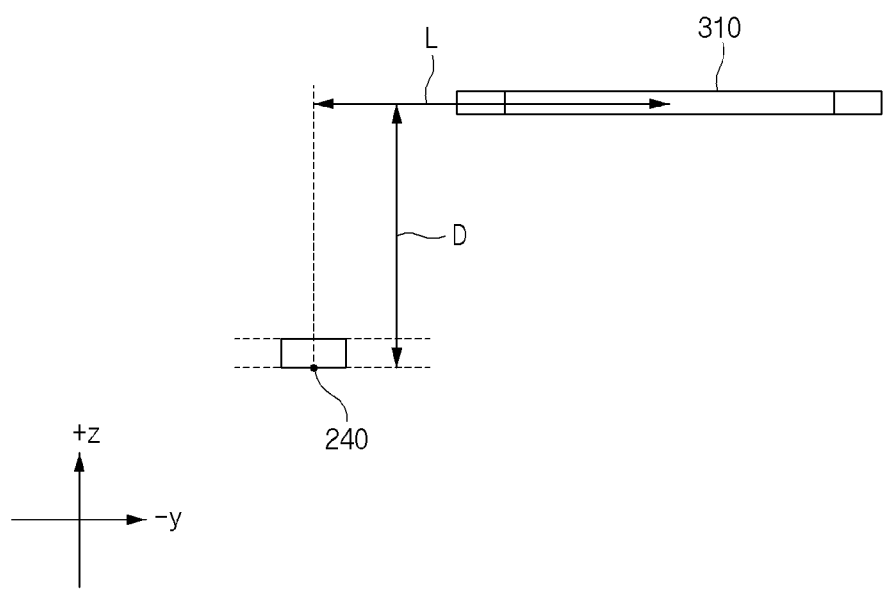
FIG. 3A is a diagram illustrating an example distance between a magnetic sensor of an electronic device and a magnet of an accessory device.

FIG. 2 illustrates an electronic device and an accessory device, according to an example embodiment. FIG. 3A is a diagram illustrating a distance between a magnetic sensor of an electronic device and a magnet of an accessory device. FIG. 3B shows a table showing a change in a magnetic field according to a change in a distance between a magnetic sensor and a magnet.

Referring to FIG. 2, one surface 305 of an accessory device 300 may have a shape corresponding to one surface 205 of an electronic device 200.

In an embodiment, the accessory device 300 may be attached to or detached from the electronic device 200.

In an embodiment, the accessory device 300 and the electronic device 200 may be aligned and fastened with respect to one axis (e.g., Z axis). For example, while overlaying the electronic device 200 in one direction (e.g., −Z axis) of an axis aligned with the electronic device 200, the accessory device 300 may be fastened (or mounted) by an external force.

In an embodiment, the accessory device 300 mounted on the electronic device 200 may be detached from the electronic device 200. For example, while the accessory device 300 moves away from the electronic device 200 in one direction (e.g., +Z axis) of the aligned axis due to the external force, the accessory device 300 may be detached. In an embodiment, when the accessory device 300 is mounted on the electronic device 200, a state of the electronic device 200 may be referred to as an "attached state". When the accessory device 300 is detached from the electronic device 200, a state of the electronic device 200 may be referred to as a "detached state".

In an embodiment, when the accessory device 300 is mounted on the electronic device 200, a magnetic sensor 240 of the electronic device 200 may be spaced from the magnet 310 of the accessory device 300 by less than a predetermined distance. In an embodiment, when the accessory device 300 is detached from the electronic device 200, the magnetic sensor 240 of the electronic device 200 may be spaced from the magnet 310 of the accessory device 300 by a predetermined distance or more.

Unlike the illustration of FIG. 2, the electronic device 200 and the accessory device 300 may constitute one device (e.g., a foldable electronic device). In this case, the electronic device 200 may be understood as a first housing in which the magnetic sensor 240 is positioned. The accessory device 300 may be understood as a second housing in which a magnetic body (e.g., a speaker, a receiver, or a magnet) is positioned. For example, a foldable electronic device may have at least one state corresponding to at least one angle formed by the electronic device 200 and the accessory device 300.

Referring to FIG. 3A, when the accessory device 300 is mounted on the electronic device 200, the magnetic sensor 240 and the magnet 310 may be spaced from each other by a distance D in a Z-axis direction, a distance L in a Y-axis direction, and/or a distance (not shown) in an X-axis direction.

In an embodiment, when the accessory device 300 is mounted on the electronic device 200, the distance D may be within a specified range. For example, the distance D may be determined by the thickness of the housing of the electronic device 200 and the thickness of the housing of the accessory device 300. For example, the distance D may be about 4 mm.

In an embodiment, the distance L in the Y-axis direction and the distance (not shown) in the X-axis direction may be experimentally determined.

Referring to FIG. 3B, table 300 shows the amount of change in intensity of a magnetic field measured by adjusting the distance L in the Y-axis direction with the distance (not shown) in the X-axis direction and the distance D fixed.

Referring to table 350, it may be seen that a change in intensity of the magnetic field in the Y-axis direction decreases as the distance L increases. As the distance L increases, the amount of change in the intensity of the magnetic field in the Z-axis direction may be slightly reduced or constant. Signs of the change in intensity of the magnetic field in the Y-axis direction and the change in intensity of the magnetic field in the Z-axis direction may be measured differently depending on the polarity of the magnet 310.

In an embodiment, the table 350 may be based on previously experimentally obtained data for each accessory device 300. For example, when the amount of change in the intensity of the magnetic field in the Y-axis direction is set to 1.6 mT, the distance L may be determined to be 4 mm.

Figure 4:
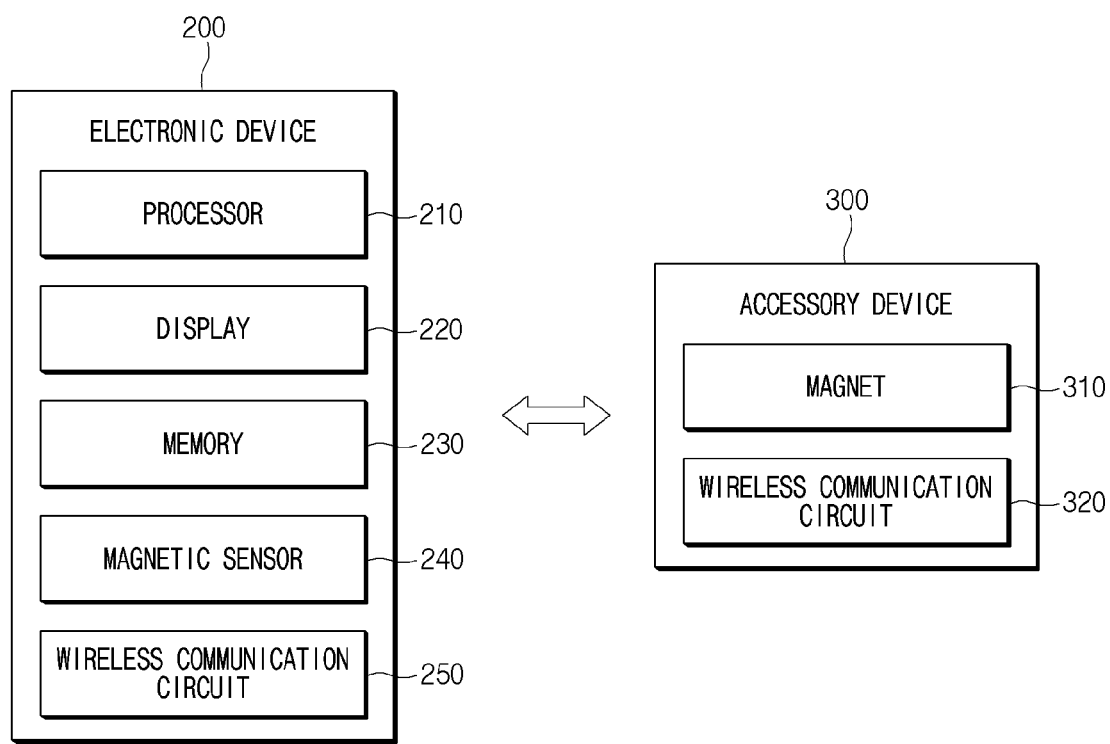
FIG. 4 is a block diagram showing a configuration of an electronic device, according to an example embodiment.

FIG. 4 is a block diagram showing a configuration of an electronic device, according to an example embodiment.

In an embodiment, the electronic device 200 may include a processor 210 (e.g., the processor 120 of FIG. 1), a display 220 (e.g., the display module 160 of FIG. 1 comprising a display), a memory 230 (e.g., the memory 130 of FIG. 1), the magnetic sensor 240 (e.g., the sensor module 176 of FIG. 1, comprising at least one sensor) and/or the wireless communication circuit 250 (e.g., the communication module 190 of FIG. 1, comprising communication circuitry). The processor 210 may be electrically connected, directly or indirectly, to the display 220, the memory 230, the magnetic sensor 240 and/or the wireless communication circuit 250.

The magnetic sensor 240 may detect the intensity and polarity of a magnetic field around the electronic device 200. The magnetic sensor 240 may convert the detected intensity of the magnetic field into an electrical signal. The magnetic sensor 240 may provide an electrical signal indicating the intensity of the magnetic field to the processor 210.

In an embodiment, the magnetic sensor 240 may detect the intensity and polarity of a magnetic field around the electronic device 200. In an embodiment, the magnetic sensor 240 may detect the intensity and polarity of a magnetic field formed by the magnet 310 of the accessory device 300. The intensity of the magnetic field detected by the magnetic sensor 240 may vary depending on a relative distance between the electronic device 200 and the accessory device 300.

In an embodiment, the wireless communication circuit 250 may support short-range wireless communication (e.g., near field communication (NFC)). In an embodiment, the processor 210 may perform short-range wireless communication with the accessory device 300 within a predetermined radius (e.g., 10 cm) from the electronic device 200 by using the wireless communication circuit 250.

In an embodiment, the accessory device 300 may include the magnet 310 and/or a wireless communication circuit 320.

The wireless communication circuit 320 may perform short-range wireless communication with the wireless communication circuit 250 of the electronic device 200. In an embodiment, the wireless communication circuit 320 may transmit a response signal to the electronic device 200 in response to a short-range wireless signal emitted by the electronic device 200.

In an embodiment, the wireless communication circuit 320 may include a NFC integrated circuit (IC) (or NFC tag). In an embodiment, the NFC IC may include a memory and/or a processor. For example, the NFC IC may be magnetically inducted by the short-range wireless signal emitted from the electronic device 200. In an embodiment, the memory of the NFC IC may store identification information of the accessory device 300. In an embodiment, the response signal may include data (e.g., identification information of the accessory device 300) stored in memory of the NFC IC.

The electronic device 200 may include the magnetic sensor 240 that identifies an intensity of a magnetic field, the wireless communication circuit 250, the processor 210, and the memory 230 electrically connected, directly or indirectly, to the magnetic sensor 240, the wireless communication circuit 250, and the processor 210, and configured to store instructions. The instructions, when executed by the processor 210, cause the electronic device 200 to identify a plurality of intensities of the magnetic field during a first period by using the magnetic sensor, to determine whether to update a reference intensity, based on the plurality of intensities, to identify a first state of the electronic device based on a comparison result between a latest intensity among the plurality of intensities and the updated reference intensity when the reference intensity is updated, and to perform a function according to the identified first state.

In an embodiment, when executed by the processor 210, the instructions may cause the electronic device 200 to emit a short-range wireless signal through the wireless communication circuit 250 based on a change of the first state of the electronic device 200 and to identify the second state of the electronic device 200 based on a response signal of the accessory device 300 to the short-range wireless signal.

In an embodiment, the first state may indicate an attached state or detached state of the accessory device 300, which is identified based on the plurality of intensities, with respect to the electronic device 200, and the second state may indicate the attached state or the detached state of the accessory device 300, which is identified based on the response signal, with respect to the electronic device 200.

In an embodiment, the short-range wireless signal may include a near field communication (NFC) signal.

In an embodiment, when executed by the processor 210, the instructions may cause the electronic device 200 to perform a function according to the attached state when each of the first state and the second state indicates the attached state.

In an embodiment, the electronic device may further include the display 220. When executed by the processor 210, the instructions may cause the electronic device 200 to display a user interface (UI) related to the function according to the attached state on the display 220 when performing the function according to the attached state, and to control a light emitting diode (LED) region included in the accessory device 300 based on a user input to the UI.

In an embodiment, when executed by the processor 210, the instructions may cause the electronic device 200, when the first state indicates the detached state, and the second state indicates the attached state, to emit the short-range wireless signal through the wireless communication circuit 250 at a first cycle during a first time and to identify the second state again based on a response signal to the wireless signal emitted at a first cycle during the first time.

In an embodiment, when executed by the processor 210, the instructions may cause the electronic device 200, when the first state indicates the detached state, and the second state thus identified again indicates the attached state, to emit the short-range wireless signal through the wireless communication circuit at a second cycle during a second time and to identify the second state again based on a response signal to the short-range wireless signal emitted at a second cycle during the second time. For example, the second time may be longer than the first time, and the second cycle may be longer than the first cycle.

In an embodiment, when executed by the processor 210, the instructions may cause the electronic device 200 to identify a pole value among the plurality of intensities based on the plurality of intensities identified during the first period satisfying a specified condition and to determine whether to update the reference intensity, by comparing the pole value and the reference intensity. For example, when executed by the processor 210, the instructions may cause the electronic device 200 to identify that the plurality of intensities satisfy the specified condition, when a value identified from the plurality of intensities is within a reference range. In an embodiment, the identified value may include a variance value of the plurality of intensities.

In an embodiment, when executed by the processor 210, the instructions may cause the electronic device 200 to identify a lowest value or a highest value among the plurality of intensities as the pole value based on the first state and polarity of the magnetic field.

In an embodiment, when executed by the processor 210, the instructions may cause the electronic device 200, when determining whether to update the reference intensity, to update the pole value to a new reference intensity when the pole value is lower than the reference intensity when the pole value is identified as the lowest value among the plurality of intensities, and to update the pole value to a new reference intensity when the pole value is higher than the reference intensity when the pole value is identified as the highest value among the plurality of intensities. In an embodiment, when executed by the processor 210, the instructions may cause the electronic device 200, when determining whether to update the reference intensity, to update the pole value to a new reference intensity when there is no reference intensity identified before a point in time when it is determined whether to update the reference intensity.

In an embodiment, the electronic device may further include a first housing in which the magnetic sensor is positioned, and a second housing in which a magnetic body is positioned. The first housing and the second housing may be configured to face the same direction in an unfolded state, and to face each other in a folded state. The first state may indicate at least one state corresponding to at least one angle between the first housing and the second housing. For example, the magnetic body includes at least one of a speaker, a receiver, and a magnet.

Figure 5:
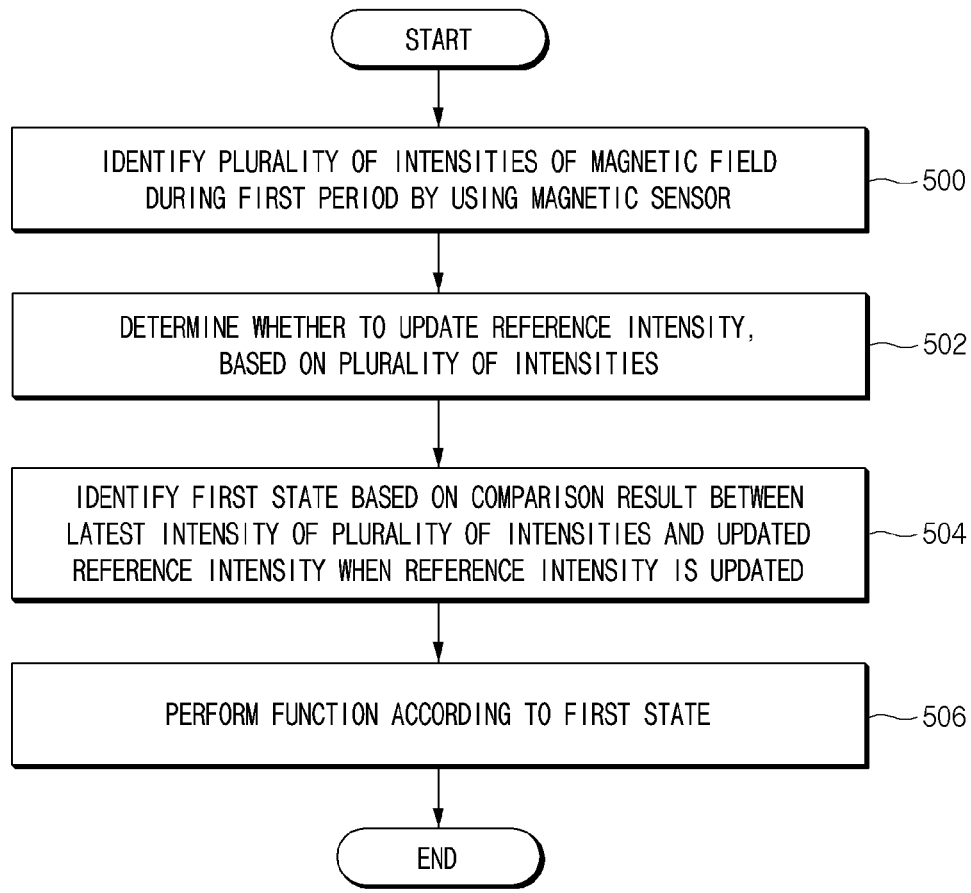
FIG. 5 is a flowchart illustrating an operation of identifying a first state by an electronic device, according to an example embodiment.
Figure 6:
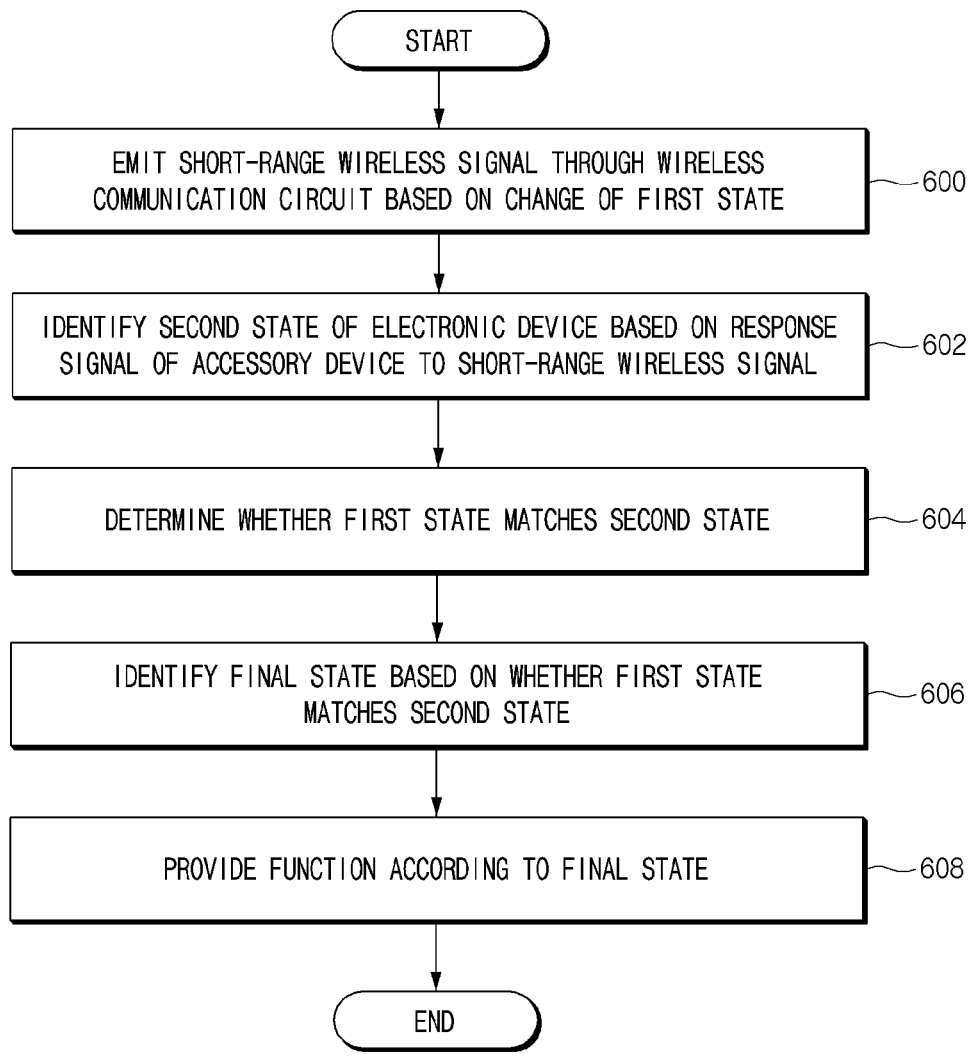
FIG. 6 is a flowchart illustrating an operation of identifying a second state by an electronic device, according to an example embodiment.

FIG. 5 is a flowchart illustrating an operation of identifying a first state by an electronic device, according to an example embodiment. FIG. 6 is a flowchart illustrating an operation of identifying a second state by an electronic device, according to an example embodiment.

In operation 500, the processor 210 may identify a plurality of intensities of the magnetic field during a first period by using the magnetic sensor 240.

In an embodiment, the processor 210 may operate the magnetic sensor 240 at regular intervals (e.g., 250 ms). For example, the first period may be 1 s. For example, during the first period (e.g., 1 s), the processor 210 may identify a plurality of (e.g., four) intensities of the magnetic field. The processor 210 may store the identified plurality of intensities in the memory 230 (e.g., a buffer).

In operation 502, the processor 210 may determine whether to update a reference intensity, based on the plurality of intensities.

In an embodiment, the processor 210 may determine whether a value identified from a plurality of intensities is within a reference range. For example, the identified value may be a variance value of a plurality of intensities. For example, when a value (e.g., a variance value) identified from the plurality of intensities is not greater than the reference range (e.g., 200 µT), the processor 210 may identify that the plurality of intensities satisfy a specified condition. The reference range (e.g., 200 µT) may be determined experimentally.

In an embodiment, when the plurality of intensities do not satisfy the specified condition, the processor 210 may not update the reference intensity. In an embodiment, the processor 210 may return to operation 500 and then may identify the intensity of the magnetic field during the first period. In another embodiment, the processor 210 may remove the intensity at the oldest time point among a plurality of intensities stored in the memory 230 and then may reconstruct the plurality of intensities of operation 500 by identifying a new intensity. The processor 210 may identify the plurality of intensities again and may proceed to operation 502.

In an embodiment, when the plurality of intensities satisfy the specified condition, the processor 210 may update the reference intensity. To update the reference intensity, the processor 210 may identify a polar value among the plurality of intensities.

In an embodiment, the processor 210 may identify the pole value based on the polarity of the magnetic field (or the magnet 310) and the state (e.g., an attached state or a detached state) of the electronic device 200. For example, the pole value may be the lowest value or the highest value among a plurality of intensities.

In an embodiment, when the electronic device 200 is detached and the polarity of the magnet 310 is S pole, the pole value may be the lowest value among the plurality of intensities. In an embodiment, when the electronic device 200 is detached, and the polarity of the magnet 310 is N pole, the pole value may be the highest value among the plurality of intensities. In an embodiment, when the electronic device 200 is attached, and the polarity of the magnet 310 is S pole, the pole value may be the highest value among the plurality of intensities. In an embodiment, when the electronic device 200 is attached, and the polarity of the magnet 310 is N pole, the pole value may be the lowest value among the plurality of intensities.

In an embodiment, when the pole value is identified as the lowest value among the plurality of intensities, the processor 210 may update the lower value among the reference intensity and the pole value to the reference intensity by comparing the reference intensity and the pole value.

In an embodiment, when the pole value is identified as the highest value among the plurality of intensities, the processor 210 may update the higher value among the reference intensity and the pole value to the reference intensity by comparing the reference intensity and the pole value.

In operation 504, when the reference intensity is updated, the processor 210 may identify a first state based on the comparison result between the latest intensity of a plurality of intensities and the updated reference intensity.

In an embodiment, the first state may indicate an attached state or a detached state of the electronic device 200 identified by using the intensity of the magnetic field.

In an embodiment, when a difference between the latest intensity and the reference intensity is not less than a threshold value (e.g., 700 µT), the processor 210 may identify that the first state is changed. In an embodiment, when the difference between the latest intensity and the reference intensity is less than the threshold value (e.g., 700 µT), the processor 210 may identify that the first state is maintained. The threshold value may be determined experimentally.

In an embodiment, the latest intensity and the reference intensity may be understood as vectors. The difference between the latest intensity and the reference intensity may be understood as a vector or a scalar quantity.

In an embodiment, when the difference between latest intensity and reference intensity is a vector, the processor 210 may perform operation 504 based on the sign of the difference between the latest intensity and the reference intensity. For example, when the difference between the latest intensity and the reference intensity is negative, the processor 210 may determine whether the difference between the latest intensity and the reference intensity is less than the threshold value (e.g., −700 µT). For example, when the sign of the difference between latest intensity and reference intensity is positive, the processor 210 may determine whether the difference between the latest intensity and the reference intensity is greater than a threshold value (e.g., 700 µT).

In an embodiment, when the difference between the latest intensity and the reference intensity corresponds to a scalar quantity, the processor 210 may compare whether the absolute value of the difference between the latest intensity and the reference intensity is greater than a threshold value (e.g., 700 µT).

In operation 506, the processor 210 may perform a function according to the first state.

In an embodiment, in operation 504, when it is identified that the first state is maintained, the processor 210 may continuously provide a function according to the attached state or detached state of the electronic device 200. In an embodiment, when it is identified that the electronic device 200 is in an attached state, based on the plurality of intensities, the processor 210 may provide a user interface (UI) corresponding to the attached state. For example, the processor 210 may display a UI for controlling a light emitting diode (LED) region of the accessory device 300 through the display 220. For another example, the processor 210 may display a specified background screen, font, and graphic object (e.g., icon) in relation to the accessory device 300 through the display 220. The processor 210 may store data for providing a UI corresponding to the attached state in the memory 230 or may receive the data from the accessory device 300. In another embodiment, when the electronic device 200 and the accessory device 300 constitute one device, the processor 210 may identify a first state indicating at least one state corresponding to at least one angle between the electronic device 200 and the accessory device 300. The processor 210 may provide a UI corresponding to the first state. For example, the processor 210 may deactivate or activate the display 220 depending on the first state.

In an embodiment, when it is identified that the first state is maintained, the processor 210 may return to operation 500 and may repeat the operations of FIG. 5.

In another embodiment, when the electronic device 200 and the accessory device 300 constitute one device (e.g., a foldable electronic device), the first state may indicate at least one state corresponding to at least one angle between the electronic device 200 and the accessory device 300. The processor 210 may identify the first state and may perform a function according to the first state.

In an embodiment, in operation 504, when it is identified that the first state is changed, the processor 210 may perform operations for identifying the second state. Hereinafter, the operations for identifying the second state will be described.

Referring to FIG. 6, in operation 600, the processor 210 may emit a short-range wireless signal through the wireless communication circuit 250 based on a change of the first state. The short-range wireless signal may include an NFC signal.

In operation 602, the processor 210 may identify the second state of the electronic device 200 based on the response signal of the accessory device 300 to the short-range wireless signal.

In an embodiment, when the accessory device 300 is located within a specific distance (e.g., 10 cm) from the electronic device 200, the wireless communication circuit 320 of the accessory device 300 may receive a short-range wireless signal. The wireless communication circuit 320 may transmit a response signal to the electronic device 200 in response to a short-range wireless signal. In an embodiment, the response signal may include identification information of the accessory device 300.

In an embodiment, when the accessory device 300 is located away from the electronic device 200 by a specific distance (e.g., 10 cm) or more, the wireless communication circuit 320 of the accessory device 300 may not receive the short-range wireless signal. In this case, the wireless communication circuit 250 of the electronic device 200 may fail to receive the response signal from the accessory device 300.

In an embodiment, when the processor 210 receives the response signal from the accessory device 300, the processor 210 may identify that the second state indicates an attached state. In an embodiment, when the processor 210 fails to receive the response signal from the accessory device 300, the processor 210 may identify that the second state indicates a detached state.

In another embodiment, when the processor 210 receives the response signal, the processor 210 may identify the second state based on the identification information of the accessory device 300 included in the response signal. For example, when the identification information of the accessory device 300 matches at least one identification information stored in the memory 230 of the electronic device 200, the processor 210 may identify that the second state indicates an attached state. For example, when the identification information of the accessory device 300 does not match at least one identification information stored in the memory 230 of the electronic device 200, the processor 210 may identify that the second state indicates a detached state.

In operation 604, the processor 210 may determine whether the first state matches the second state. For example, the first state may indicate an attached state or a detached state of the electronic device 200 identified by using the magnetic sensor 240. For example, the second state may indicate an attached state or a detached state of the electronic device 200 identified by using the wireless communication circuit 250.

In operation 606, the processor 210 may identify a final state based on whether the first state matches the second state. In an embodiment, the final state may indicate an attached state or a detached state of the electronic device 200.

In an embodiment, when each of the first state and the second state is the detached state, the processor 210 may identify that the final state is the detached state. In an embodiment, when each of the first state and the second state is the attached state, the processor 210 may identify that the final state is the attached state.

In an embodiment, when the first state is the attached state and the second state is the detached state, the processor 210 may identify that the final state is the detached state.

In an embodiment, when the first state is the detached state and the second state is the attached state, the processor 210 may re-identify the second state during the specified period, and then may determine whether the first state matches the re-identified second state. When the first state matches the re-identified second state, the processor 210 may identify that the final state is the detached state. When the first state does not match the re-identified second state, the processor 210 may identify that the final state is the attached state.

In operation 608, the processor 210 may provide a function according to the final state. In an embodiment, when the final state is the attached state, the processor 210 may provide a UI corresponding to the attached state to the display 220. For example, the processor 210 may display a UI for controlling a LED region of the accessory device 300 through the display 220. For another example, the processor 210 may display a specified background screen, font, and graphic object (e.g., icon) in relation to the accessory device 300 through the display 220. The processor 210 may store data for providing a UI corresponding to the attached state in the memory 230 or may receive the data from the accessory device 300. For example, when the final state is the detached state, the processor 210 in an embodiment may remove the UI corresponding to the attached state.

Figure 7:
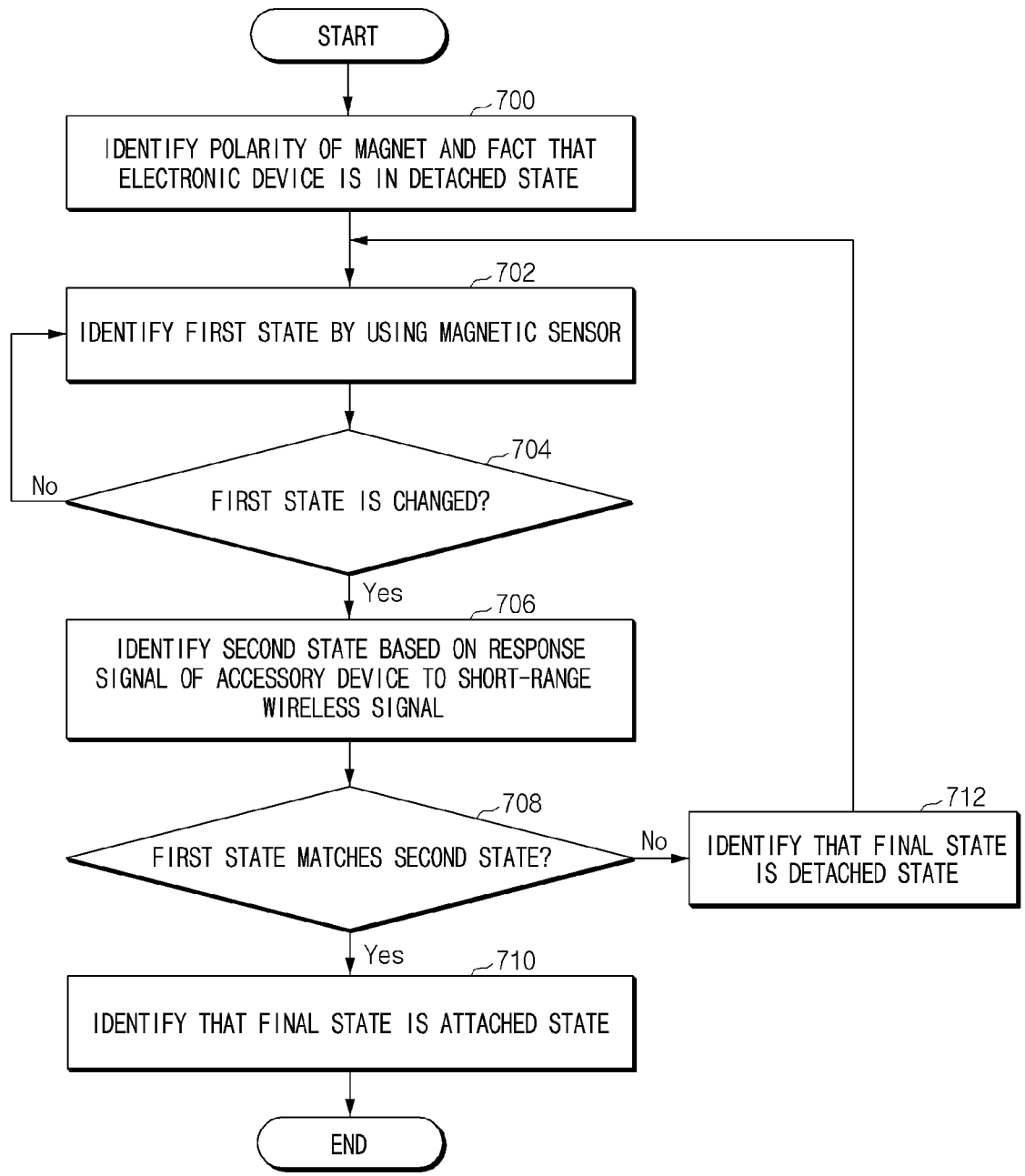
FIG. 7 is a flowchart illustrating an operation of an electronic device in a detached state, according to an example embodiment.

FIG. 7 is a flowchart illustrating an operation of an electronic device in a detached state, according to an example embodiment.

Configurations of FIGS. 2 to 4 may be referred to for the description of FIG. 7.

In operation 700, the processor 210 may identify polarity (e.g., S pole or N pole) of the magnet 310 and the fact that the electronic device 200 is in a detached state.

In an embodiment, the processor 210 may identify the state of the electronic device 200 by using the wireless communication circuit 250. For example, the processor 210 may emit a short-range wireless signal by using the wireless communication circuit 250. The processor 210 may identify that the electronic device 200 is in a detached state, based on the fact that the processor 210 fails to receive a response signal of the accessory device 300 to the short-range wireless signal.

In operation 702, the processor 210 may identify a first state by using the magnetic sensor 240. The identification method of the first state may be referenced by the description of FIG. 5.

In an embodiment, the magnetic sensor 240 may identify a plurality of intensities of a magnetic field at a specific cycle (e.g., 250 ms) during a specific period (e.g., 1 s). For example, the processor 210 may identify intensities of four magnetic fields during the first period. In an embodiment, the processor 210 may store the identified plurality of intensities in the memory 230 (e.g., a buffer).

In an embodiment, when a value (e.g., a variance value) identified from the plurality of intensities is greater than a reference range (e.g., 200 µT), the processor 210 may identify the plurality of intensities again. For example, the processor 210 may again identify the plurality of intensities of the magnetic field at a specific cycle (e.g., 250 ms) during a specific period (e.g., 1 s). For another example, the processor 210 may remove the intensity at the oldest time point among a plurality of intensities stored in the memory 230 and then may reconstruct the plurality of intensities by identifying a new intensity. The processor 210 may identify the first state based on the plurality of intensities thus identified again.

In an embodiment, when the value (e.g., variance value) identified from a plurality of intensities is within the reference range (e.g., 200 µT), the processor 210 may identify the pole value and may update the reference intensity.

In an embodiment, when the polarity of the magnet 310 is S pole, the processor 210 may identify the lowest value among intensities of a plurality of magnetic fields as a pole value. In an embodiment, the processor 210 may update a lower value to the reference intensity by comparing the reference intensity and the pole value. In an embodiment, when the previously identified reference intensity is not present, the processor 210 may update the pole value to the reference intensity.

In an embodiment, when the polarity of the magnet 310 is N pole, the processor 210 may identify the highest value among intensities of a plurality of magnetic fields as a pole value. In an embodiment, the processor 210 may update a higher value to the reference intensity by comparing the reference intensity and the pole value. In an embodiment, when the previously identified reference intensity is not present, the processor 210 may update the pole value to the reference intensity.

In an embodiment, the processor 210 may determine whether a difference between the reference intensity and the latest intensity of the plurality of intensities is greater than or equal to a threshold value (e.g., 700 µT).

In an embodiment, when the difference between the reference intensity and the latest intensity is less than the threshold value (e.g., 700 µT), the processor 210 may identify that the first state is not changed (704—NO). The processor 210 may return to operation 702.

In an embodiment, when the difference between the reference intensity and the latest intensity is greater than or equal to the threshold value (e.g., 700 µT), the processor 210 may identify that the first state is changed (704—YES). For example, the first state may indicate an attached state. The processor 210 may proceed to operation 706.

In operation 706, the processor 210 may identify the second state based on the response signal of the accessory device 300 to the short-range wireless signal. In an embodiment, when receiving the response signal of the accessory device 300, the processor 210 may identify that the second state indicates an attached state. In an embodiment, when the processor 210 fails to receive the response signal of the accessory device 300, the processor 210 may identify that the second state indicates the detached state.

In operation 708, the processor 210 may determine whether the first state matches the second state.

When the first state matches the second state (708—YES), the processor 210 may proceed to operation 710 and may identify that the final state of the electronic device 200 is an attached state. In an embodiment, the processor 210 may provide a function according to the attached state. In an embodiment, the processor 210 may terminate the operation and proceed to operation 802 of FIG. 8.

When the first state does not match the second state (708—NO), the processor 210 may proceed to operation 712, may identify that the final state of the electronic device 200 is a detached state, and may return to operation 702. For example, when identification information of the accessory device 300 included in the response signal of the accessory device 300 does not match at least one identification information stored in the memory 230 of the electronic device 200, the first state may not match the second state.

Figure 8:
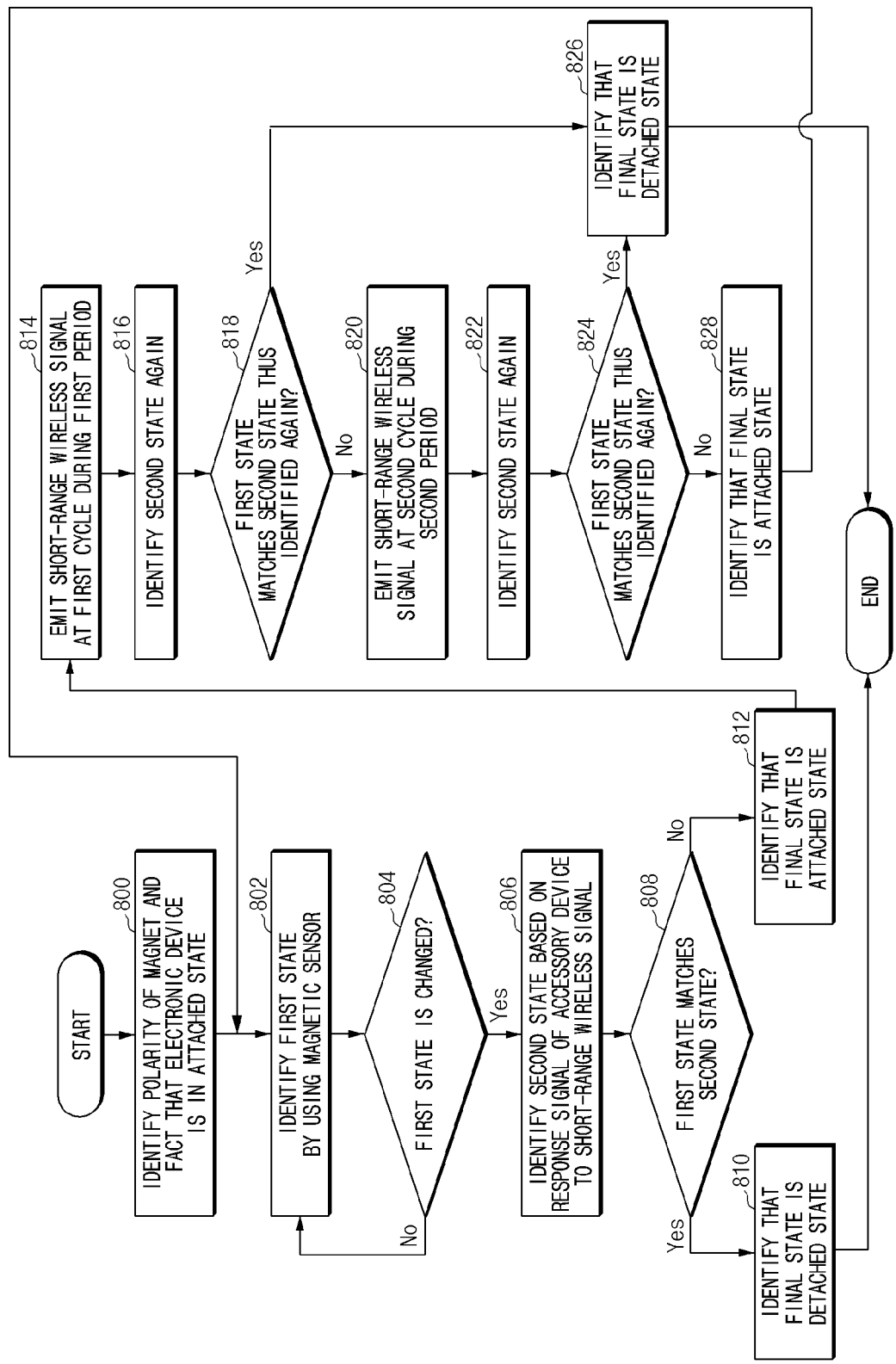
FIG. 8 is a flowchart illustrating an operation of an electronic device in an attached state, according to an example embodiment.

FIG. 8 is a flowchart illustrating an operation of an electronic device in an attached state, according to an example embodiment.

Configurations of FIGS. 2 to 4 may be referred to for the description of FIG. 8.

In operation 800, the processor 210 may identify that polarity (e.g., S pole or N pole) of the magnet 310 and the state of the electronic device 200 indicate an attached state.

In an embodiment, the processor 210 may identify that the electronic device 200 is in the attached state, based on receiving a response signal of the accessory device 300 to a short-range wireless signal.

In operation 802, the processor 210 may identify a first state by using the magnetic sensor 240. The identification method of the first state may be referenced by the description of FIG. 5.

In an embodiment, the magnetic sensor 240 may identify a plurality of intensities of a magnetic field at a specific cycle (e.g., 250 ms) during a specific period (e.g., 1 s). In an embodiment, the processor 210 may store the identified plurality of intensities in the memory 230.

In an embodiment, when a value (e.g., a variance value) identified from the plurality of intensities is greater than a reference range (e.g., 200 µT), the processor 210 may identify the plurality of intensities again. For example, the processor 210 may again identify the plurality of intensities of the magnetic field at a specific cycle (e.g., 250 ms) during a specific period (e.g., 1 s). For another example, the processor 210 may remove the intensity at the oldest time point among a plurality of intensities stored in the memory 230 and then may reconstruct the plurality of intensities by identifying a new intensity. The processor 210 may identify the first state based on the plurality of intensities thus identified again.

In an embodiment, when the value (e.g., a variance value) identified from the identified plurality of intensities is within the reference range (e.g., 200 µT), the processor 210 may identify the pole value and may update the reference intensity.

In an embodiment, when the polarity of the magnet 310 is S pole, the processor 210 may identify the highest value among intensities of a plurality of magnetic fields as a pole value. In an embodiment, the processor 210 may update a higher value to the reference intensity by comparing the reference intensity and the pole value. In an embodiment, when the previously identified reference intensity is not present, the processor 210 may update the pole value to the reference intensity.

In an embodiment, when the polarity of the magnet 310 is N pole, the processor 210 may identify the lowest value among intensities of a plurality of magnetic fields as a pole value. In an embodiment, the processor 210 may update a lower value to the reference intensity by comparing the reference intensity and the pole value. In an embodiment, when the previously identified reference intensity is not present, the processor 210 may update the pole value to the reference intensity.

In an embodiment, the processor 210 may determine whether a difference between the reference intensity and the latest intensity of the plurality of intensities is greater than or equal to a threshold value (e.g., 700 µT).

In an embodiment, when the difference between the reference intensity and the latest intensity is less than the threshold value (e.g., 700 µT), the processor 210 may identify that the first state is not changed (804—NO). The processor 210 may return to operation 802.

In an embodiment, when the difference between the reference intensity and the latest intensity is greater than or equal to the threshold value (e.g., 700 µT), the processor 210 may identify that the first state is changed (804—YES). For example, the first state may indicate a detached state. The processor 210 may proceed to operation 806.

In operation 806, the processor 210 may identify the second state based on the response signal of the accessory device 300 to the short-range wireless signal.

In operation 808, the processor 210 may determine whether the first state matches the second state.

When the first state matches the second state (808—YES), the processor 210 may proceed to operation 810 and may identify that the final state of the electronic device 200 is the detached state. In an embodiment, the processor 210 may provide a function according to the detached state. In an embodiment, the processor 210 may terminate the operation and proceed to operation 702 of FIG. 7.

When the first state does not match the second state (808—NO), the processor 210 may proceed to operation 812 and may identify that the final state of the electronic device 200 is an attached state. For example, when the electronic device 200 is detached from the accessory device 300 but a distance between the electronic device 200 and the accessory device 300 is within a reach range (e.g., 10 cm) of the short-range signal of the wireless communication circuit 250, the first state may not match the second state. In an embodiment, the processor 210 may proceed to operation 814 of FIG. 8.

In operation 814, the processor 210 may emit a wireless signal at a first cycle (e.g., 5 s) during a first period (e.g., 1 min).

In operation 816, the processor 210 may identify the second state again based on a response signal of the accessory device 300 to the wireless signal emitted in operation 814.

In operation 818, the processor 210 may determine whether the first state matches the second state thus identified again.

When the first state matches the second state (818—YES), the processor 210 may proceed to operation 826 and may identify that the final state is the detached state. In an embodiment, the processor 210 may terminate the operation and proceed to operation 702 of FIG. 7.

When the first state does not match the second state (818—NO), the processor 210 may proceed to operation 820 and may emit a short-range wireless signal at a second cycle (e.g., 20 s) during a second period (e.g., 5 min). For example, the second period may be longer than the first period. For another example, the second period may be shorter than or equal to the first period. For example, the second cycle may be longer than the first cycle. In operation 820, the processor 210 operates at a longer cycle than in operation 814, thereby reducing power consumption. For another example, the second cycle may be shorter than or equal to the first cycle.

In operation 822, the processor 210 may identify the second state again based on a response signal of the accessory device 300 to the wireless signal emitted in operation 820. "Based on" as used herein covers based at least on.

In operation 824, the processor 210 may determine whether the first state matches the second state thus identified again.

When the first state matches the second state (824—YES), the processor 210 may proceed to operation 826 and may identify that the final state is the detached state.

In operation 826, the processor 210 may provide a function according to the detached state. In an embodiment, the processor 210 may terminate the operation and proceed to operation 702 of FIG. 7.

When the first state does not match the second state (824—NO), the processor 210 may proceed to operation 828 and may identify that the final state is an attached state. The processor 210 may return to operation 802.

Figure 9A:
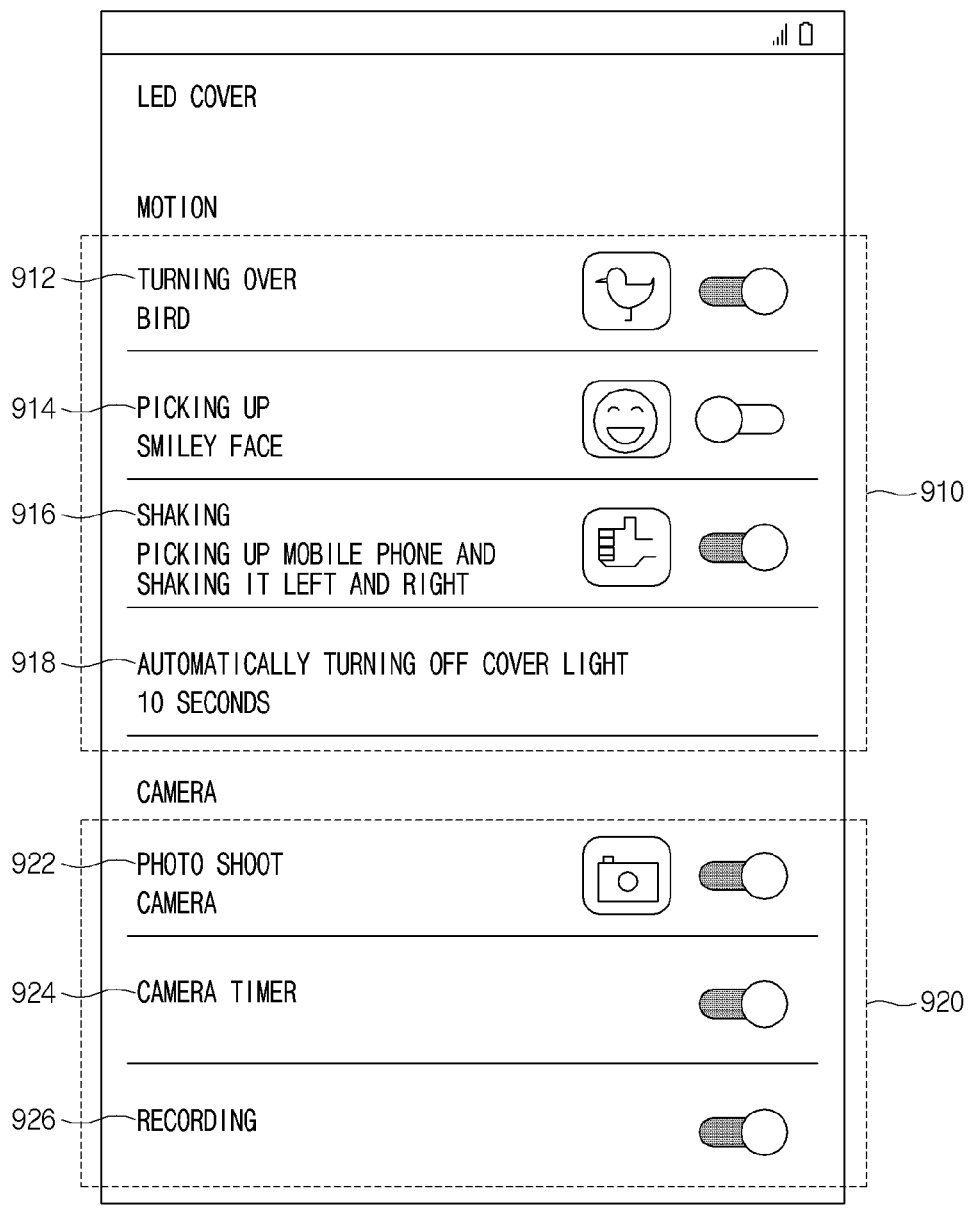
FIG. 9A illustrates a UI provided in an attached state of an electronic device, according to an example embodiment.
Figure 9B:
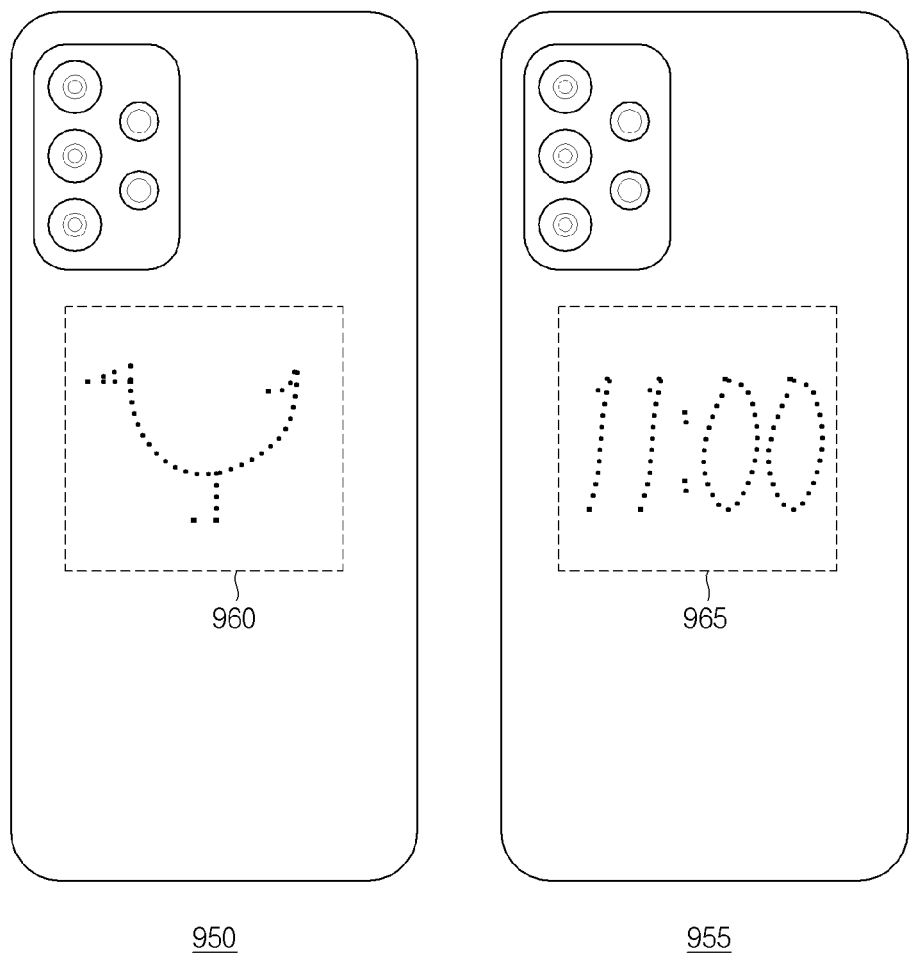
FIG. 9B illustrates an LED region of an accessory device when an electronic device is in an attached state, according to an example embodiment.

FIG. 9A illustrates a UI provided in an attached state of an electronic device, according to an example embodiment. FIG. 9B illustrates an LED region of an accessory device when an electronic device is in an attached state, according to an embodiment.

Configurations of FIGS. 2 to 4 may be referred to for description of FIGS. 9A to 9B.

Referring to FIG. 9A, when the electronic device 200 is in an attached state, the processor 210 may display a screen 900 on the display 220. The screen 900 may include a UI according to an attached state.

In an embodiment, a region 910 may include a UI for controlling the display of a LED region of the accessory device 300 according to the movement of the electronic device 200. For example, a UI 912 may indicate LED region control corresponding to a case where a front surface of the electronic device 200 is placed toward the ground (or a case where the front surface of the display 220 is in contact with an external object); a UI 914 may indicate LED region control corresponding to a case where the electronic device 200 is held by a user; and, a UI 916 may indicate LED region control corresponding to a case where the electronic device 200 is shaken left and right by the user. The processor 210 may receive a user input to the region 910 and then may control a LED display according to each case.

Referring to FIG. 9B, the processor 210 may receive a user input to the UI 912 and may display a specified shape (e.g., a bird) on the LED region of the accessory device 300 as shown with reference to reference number 950. In an embodiment, as shown with reference to reference number 955, the processor 210 may display a specified phrase (e.g., 11:00) on the LED region of the accessory device 300 based on user settings. For example, the specified phrase may indicate a current time.

Returning to FIG. 9A, a region 920 may include a UI for controlling the display of the LED region of the accessory device 300 according to an operation of a camera (e.g., the camera module 180 in FIG. 1) of the electronic device 200. For example, a UI 922 may indicate LED region control corresponding to a case where a capture function of a camera is executed; a UI 924 may indicate LED region control corresponding to a case where a camera shooting timer is set; and, a UI 926 may indicate LED region control corresponding to a case where a camera recording function is executed. The processor 210 may receive a user input to the region 920 and then may control a LED display according to each case.

Figure 10:
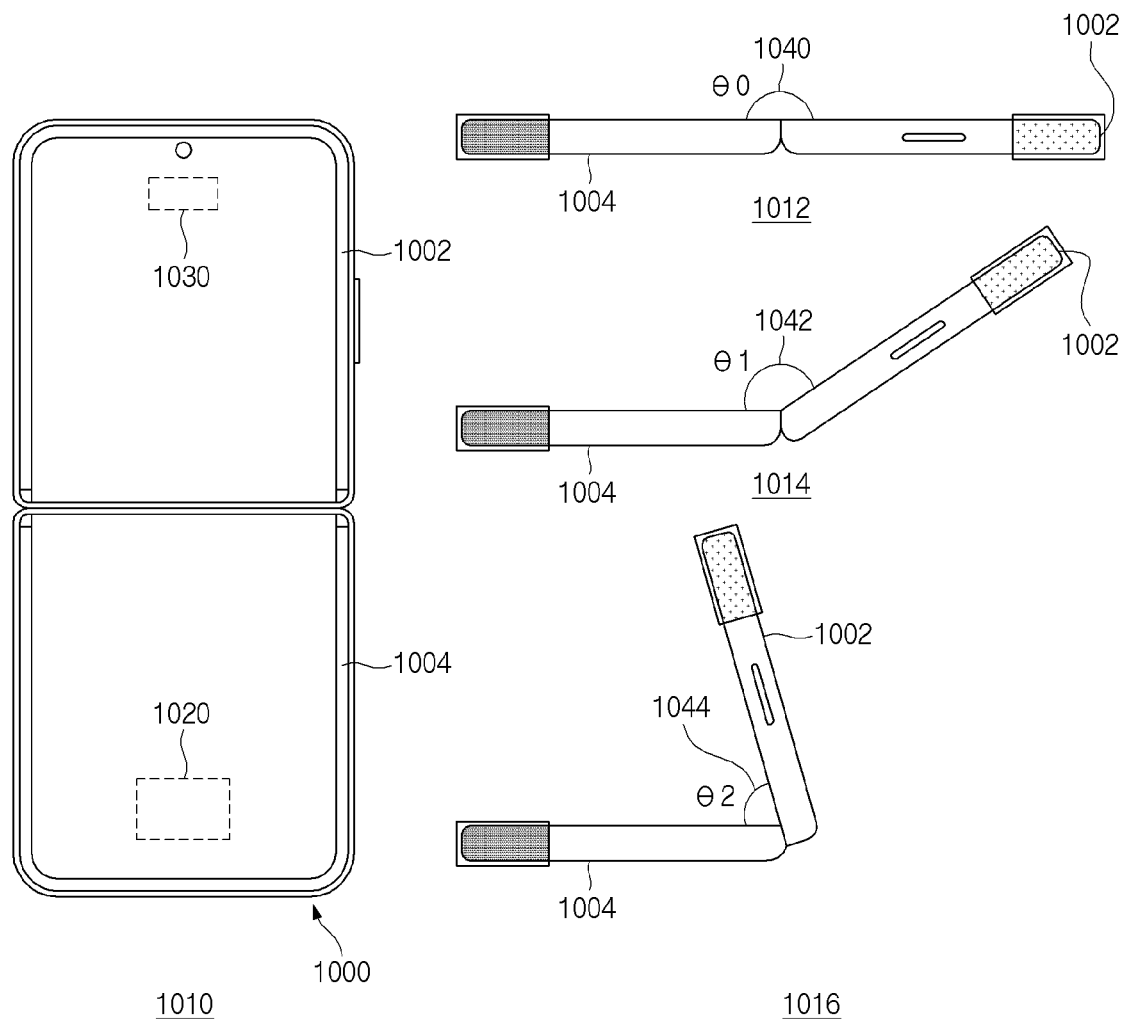
FIG. 10 illustrates an operation of an electronic device, according to an example embodiment.

FIG. 10 illustrates an operation of an electronic device, according to an example embodiment.

Reference number 1010 shows one surface (e.g., a front surface) of an electronic device 1000. Reference numbers 1012 to 1016 show one surface (e.g., a side surface) of the electronic device 1000 according to at least one state.

The electronic device 1000 (e.g., the electronic device 101 in FIG. 1) may be a foldable electronic device. Reference number 1010 shows the electronic device 1000 in an unfolded state. In an embodiment, the electronic device 1000 may include first housing 1002 and second housing 1004.

In an embodiment, the first housing 1002 and the second housing 1004 may be placed to face the same direction in an unfolded state. In an embodiment, the first housing 1002 and the second housing 1004 may be positioned to face each other in a folded state.

In an embodiment, a magnetic body 1030 may be disposed in the first housing 1002. In an embodiment, the magnetic sensor 1020 may be disposed in the second housing 1004. A magnetic sensor 1020 may identify the intensity of a magnetic field according to a relative distance between the magnetic sensor 1020 and the magnetic body 1030. For example, the magnetic body 1030 may include a speaker and/or receiver having magnetism. For still another example, the magnetic body 1030 may be a magnet.

In an embodiment, the electronic device 1000 may have at least one state according to the extent to which the electronic device 1000 is folded. For example, at least one state may be defined by an angle between the first housing 1002 and the second housing 1004 (e.g., 00, 01, or 02). For example, a case 1012 where the angle between the first housing 1002 and the second housing 1004 is 00 may be defined as a 3-1st state; a case 1014 where the angle between the first housing 1002 and the second housing 1004 is 01 may be defined as a 3-2nd state; and, a case 1016 where the angle between the first housing 1002 and the second housing 1004 is 02 may be defined as a 3-3rd state.

In an embodiment, the electronic device 1000 may identify a state of the electronic device 1000 by using the magnetic sensor 1020 and may provide a function according to the state.

In an embodiment, the magnetic sensor 1020 may identify a plurality of intensities of a magnetic field. The electronic device 1000 may determine whether a value (e.g., a variance value) identified from the plurality of intensities is within a reference range. When the value (e.g., a variance value) identified from the plurality of intensities is within the reference range, the electronic device 1000 may identify a pole value among the plurality of intensities. The electronic device 1000 may update the reference intensity by comparing the pole value and the reference intensity.

In an embodiment, when a difference between the latest intensity among the plurality of intensities and the reference intensity is greater than or equal to a threshold value, the electronic device 1000 may identify that the state of the electronic device 1000 is changed. For example, the changed state of the electronic device 1000 may be one of at least one state.

In an embodiment, the threshold value may be selected differently depending on the degree of a state change of the electronic device 1000. For example, a threshold value in a case where the electronic device 1000 in the 3-1st state is in the 3-2nd state may be lower than a threshold value in a case where the electronic device 1000 in the 3-1st state is in the 3-3rd state.

In an embodiment, at least one section according to the state change of the electronic device 1000 may be set. For example, a difference between the latest intensity and the reference intensity may be included in one among at least one section. In an embodiment, as the degree of a change (or a change in the angle between the first housing 1002 and the second housing 1004) is greater, a difference between the latest intensity and the reference intensity may be included in a higher section.

In an embodiment, the electronic device 1000 may identify the state of the electronic device 200 based on the identified plurality of intensities and then may provide a function according to the identified state. For example, different functions may be provided for at least one respective state (e.g., the 3-1st state, the 3-2nd state, or the 3-3rd state).

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a magnetic sensor configured to identify an intensity of a magnetic field;
a wireless communication circuit;
a processor comprising processing circuitry; and
a memory electrically connected to the magnetic sensor, the wireless communication circuit, and the processor, and configured to store instructions,
wherein the processor is individually and/or collectively configured to cause the electronic device to:
identify a plurality of intensities of the magnetic field during a first period at least by using the magnetic sensor;
identify a first state of the electronic device indicating an attached state or a detached state of an accessory device based on a comparison result between the plurality of intensities and a reference intensity;
based on identifying the first state of the electronic device, emit a short-range wireless signal through the wireless communication circuit at a first cycle during a first time;
identify a second state of the electronic device indicating the attached state or the detached state of the accessory device based on a response signal to the wireless signal emitted at the first cycle during the first time; and
finally identify a state of the electronic device indicating the attached state or the detached state of the accessory device based on the first identification result and second identification result.

2. The electronic device of claim 1, wherein the processor is configured to cause the electronic device to:
based on the first identification result is identical to the second identification result, finally identify the second identification result as the state of the electronic device indicating the attached state or the detached state of the accessory device.

3. The electronic device of claim 1, wherein the short-range wireless signal includes a near field communication (NFC) signal.

4. The electronic device of claim 1, wherein the processor is configured to cause the electronic device to:
perform a function corresponding to the finally identified state of the electronic device indicating the attached state or the detached state of the accessory device.

5. The electronic device of claim 4, further comprising:
a display,
wherein the processor is configured to cause the electronic device to:
when performing the function corresponding to the finally identified state of the electronic device,
display a user interface (UI) related to the function corresponding to the finally identified state of the electronic device on the display; and
control a light emitting diode (LED) region included in the accessory device based on a user input to the UI.

6. The electronic device of claim 1, wherein the processor is configured to cause the electronic device to:
based on the first identification result is not identical to the second identification result, emit the short-range wireless signal through the wireless communication circuit at a second cycle during a second time; and
identify the second state of the electronic device indicating the attached state or the detached state of the accessory device again based on a response signal to the short-range wireless signal emitted at the second cycle during the second time,
wherein the second time is longer than the first time, and
wherein the second cycle is longer than the first cycle.

7. The electronic device of claim 1, wherein the processor is configured to cause the electronic device to:
based on the first identification result is not identical to the second identification result, finally identify the second identification result as the state of the electronic device indicating the attached state or the detached state of the accessory device.

8. The electronic device of claim 1, wherein the processor is configured to cause the electronic device to:
identify a pole value indicating identify a lowest value or a highest value among the plurality of intensities based on the plurality of intensities identified during the first period satisfying a specified condition; and
update the reference intensity, at least by comparing the pole value and the reference intensity.

9. The electronic device of claim 8, wherein the processor is configured to cause the electronic device to:
when a value identified from the plurality of intensities is within a reference range, identify that the plurality of intensities satisfy the specified condition.

10. The electronic device of claim 9, wherein the identified value includes a variance value of the plurality of intensities.

11. The electronic device of claim 8, wherein the processor is configured to cause the electronic device to:
identify the lowest value or the highest value among the plurality of intensities as the pole value based on the first state of the electronic device and polarity of the magnetic field.

12. The electronic device of claim 11, wherein the processor is configured to cause the electronic device, when determining whether to update the reference intensity, to:
when the pole value is lower than the reference intensity when the pole value is identified as the lowest value among the plurality of intensities, update the reference intensity based on the lowest; and
when the pole value is higher than the reference intensity when the pole value is identified as the highest value among the plurality of intensities, update the reference intensity based on the highest value.

13. The electronic device of claim 11, wherein the processor is configured to cause the electronic device, when determining whether to update the reference intensity, to:
when there is no reference intensity identified before a point in time when it is determined whether to update the reference intensity, update the pole value to a new reference intensity.

14. The electronic device of claim 1, further comprising:
a first housing in which the magnetic sensor is positioned; and
a second housing in which a magnetic body is positioned,
wherein the first housing and the second housing are configured to face the same direction in an unfolded state of the electronic device, and to face each other in a folded state of the electronic device, and
wherein the first state of the electronic device indicates at least one state corresponding to at least one angle between the first housing and the second housing.

15. The electronic device of claim 14, wherein the magnetic body includes at least one of a speaker, a receiver, and a magnet.

16. An operating method of an electronic device, the method comprising:
identifying a plurality of intensities of a magnetic field during a first period;
identifying a first state of the electronic device indicating an attached state or a detached state of an accessory device based on a comparison result between the plurality of intensities and a reference intensity;
based on identifying the first state of the electronic device, emitting a short-range wireless signal at a first cycle during a first time;
identifying a second state of the electronic device indicating the attached state or the detached state of the accessory device based on a response signal to the wireless signal emitted at the first cycle during the first time; and
then identifying a state of the electronic device indicating the attached state or the detached state of the accessory device based on the first identification result and second identification result.

17. The method of claim 16, further comprising:
performing a function corresponding to the then identified state of the electronic device indicating the attached state or the detached state of the accessory device.

18. The method of claim 16, further comprising:
based on the first identification result is identical to the second identification result, then identifying the second identification result as the state of the electronic device indicating the attached state or the detached state of the accessory device.

19. The method of claim 16, further comprising:
based on the first identification result is not identical to the second identification result, emitting the short-range wireless signal at a second cycle during a second time; and
identifying the second state of the electronic device indicating the attached state or the detached state of the accessory device again based on a response signal to the short-range wireless signal emitted at the second cycle during the second time,
wherein the second time is longer than the first time, and
wherein the second cycle is longer than the first cycle.

20. The method of claim 17, wherein the performing of the function corresponding to the finally identified state of the electronic device includes:
 displaying a user interface (UI) related to the function corresponding to the finally identified state of the electronic device; and
 controlling a LED region included in the accessory device based on a user input to the UI.

* * * * *